United States Patent
Caron

(10) Patent No.: US 10,556,391 B2
(45) Date of Patent: Feb. 11, 2020

(54) THERMALLY EXPANSIVE MOLDING TOOL AND A METHOD OF MOLDING WITH SUCH TOOL

(71) Applicant: BOMBARDIER INC., Dorval (CA)

(72) Inventor: Richard Caron, Mascouche (CA)

(73) Assignee: BOMBARDIER INC., Dorval (CA)

(\*) Notice: Subject to any disclaimer, the term of this patent is extended or adjusted under 35 U.S.C. 154(b) by 349 days.

(21) Appl. No.: 15/318,769

(22) PCT Filed: Jun. 12, 2015

(86) PCT No.: PCT/IB2015/054483
§ 371 (c)(1),
(2) Date: Dec. 14, 2016

(87) PCT Pub. No.: WO2015/198184
PCT Pub. Date: Dec. 30, 2015

(65) Prior Publication Data
US 2017/0120542 A1    May 4, 2017

Related U.S. Application Data

(60) Provisional application No. 62/016,325, filed on Jun. 24, 2014.

(51) Int. Cl.
*B29C 70/56* (2006.01)
*B29C 70/44* (2006.01)
(Continued)

(52) U.S. Cl.
CPC ............. *B29C 70/44* (2013.01); *B29C 33/38* (2013.01); *B29C 33/48* (2013.01); *B29C 70/54* (2013.01); *B29K 2995/0012* (2013.01)

(58) Field of Classification Search
CPC .................................................... B29C 70/44
See application file for complete search history.

(56) References Cited

U.S. PATENT DOCUMENTS

| 4,388,263 A | 6/1983 | Prunty |
| 5,084,219 A | 1/1992 | Sigur |

(Continued)

FOREIGN PATENT DOCUMENTS

| CN | 101291805 A | 10/2008 |
| EP | 2006083 A2 | 12/2008 |

(Continued)

OTHER PUBLICATIONS

PCT international Search Report and Written Opinion dated Sep. 9, 2015 re: International Application No. PCT/IB2015/054483.
Walter S. Cremens, Thermal Expansion Molding Process for Aircraft Composite Structures, SAE Technical Paper Series, Society of Automotive Engineers, Inc., Turbine Powered Aircraft meeting, Apr. 1980, pp. 1-16, USA.
Michael Chun-Yung Niu, Composite Airframe Structures, Chapter 3.0, pp. 168-171, Conmilit Press, 1992, USA.

(Continued)

*Primary Examiner* — Jacob T Minskey
*Assistant Examiner* — Cedrick S Williams
(74) *Attorney, Agent, or Firm* — Norton Rose Fulbright Canada LLP

(57) ABSTRACT

A device (10, 40, 50, 60) and a related method for selectively applying pressure to a fiber impregnated resin, where the device includes a thermally expansive material having a body (12) which extends in an axial direction from an upper terminal surface (14) to an opposite lower terminal surface (16), a first retaining member (18) affixed to one of the upper terminal surface and the lower terminal surface, wherein the first retaining member is configured to limit expansion of the thermally expansive material in a direction substantially perpendicular to the axial direction when the thermally expansive material is subjected to an increase in temperature.

13 Claims, 10 Drawing Sheets

(51) Int. Cl.
*B29C 33/38* (2006.01)
*B29C 33/48* (2006.01)
*B29C 70/54* (2006.01)

(56) References Cited

U.S. PATENT DOCUMENTS

| | | | |
|---|---|---|---|
| 5,204,042 A | 4/1993 | James et al. | |
| 5,356,252 A * | 10/1994 | Whistler, III | ........... F16B 13/06 |
| | | | 411/45 |
| 5,597,435 A * | 1/1997 | Desautels | ............... B29C 33/30 |
| | | | 156/245 |
| 6,579,404 B2 | 6/2003 | Lewis et al. | |

FOREIGN PATENT DOCUMENTS

| | | | |
|---|---|---|---|
| WO | 2011015823 A1 | 2/2011 | |
| WO | WO-2011015823 A1 * | 2/2011 | ........... B29C 33/302 |

OTHER PUBLICATIONS

The State Intellecutal Property Office of the People's Replublic of China, Notification of First Office Action dated Mar. 29, 2018 re: Application No. 201580033506.5.
English translation of China patent document No. CN 101291805A dated Oct. 22, 2008, https://patents.google.com/patent/CN101291805A/en?oq=CN101291805A, accessed May 7, 2018.
European Patent Office, Communication pursuant to Article 94(3) EPC dated Dec. 22, 2017 on corresponding EP Application No. 15 731 126.7.
The State Intellectual Property Office of the People's Republic of China, Notification of Second Office Action dated Aug. 23, 2018 re: Chinese Patent Application No. 201580033506.5.

* cited by examiner

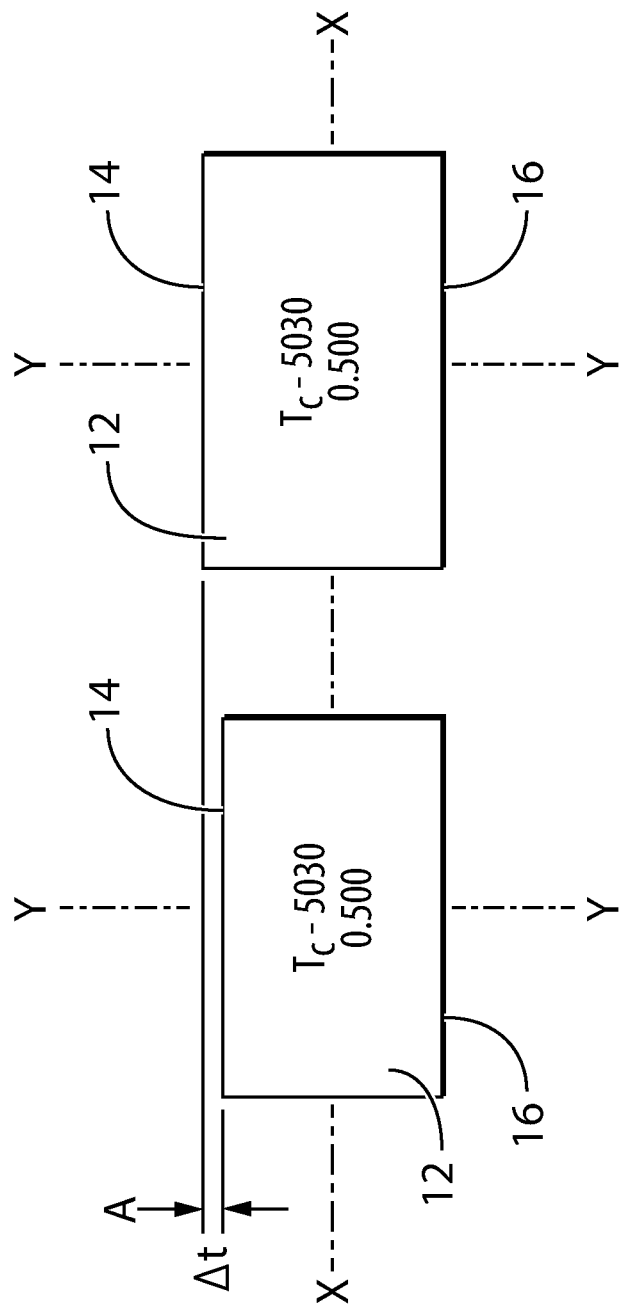

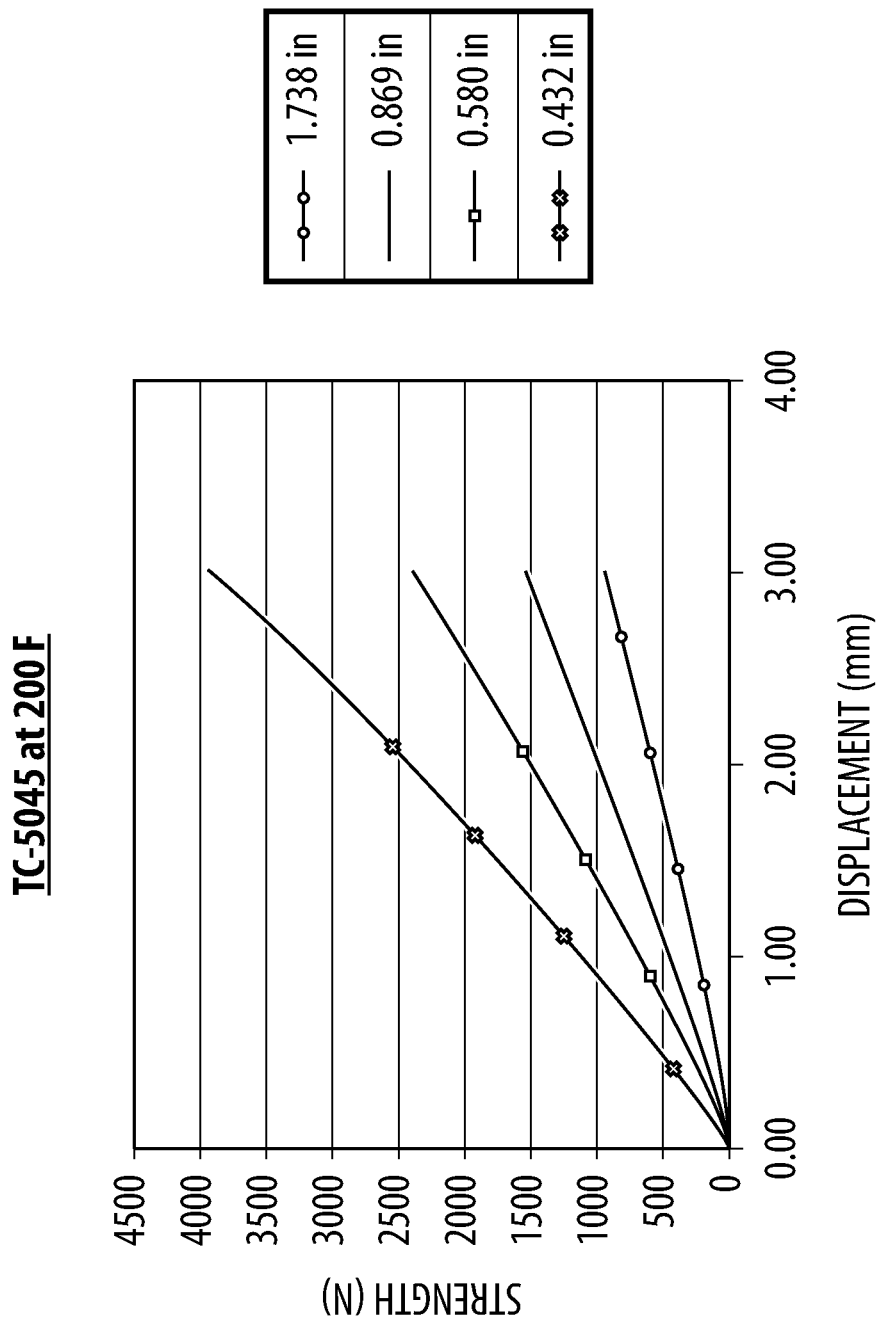

THERMALLY EXPANSIVE MOLDING TOOL AND A METHOD OF MOLDING WITH SUCH TOOL

CROSS-REFERENCE TO RELATED APPLICATION

This application is a national phase application under 35 U.S.C. 371 of International Patent Application No. PCT/IB2015/054483 filed on Jun. 12, 2015, which claims priority from U.S. Provisional Patent Application Ser. No. 62/016,325, filed on Jun. 24, 2014, the entire content of which is incorporated herein by reference.

TECHNICAL FIELD

The invention relates to molding tools and, more particularly, to a thermally expansive tool for selectively applying pressure to a fiber impregnated resin during vacuum-bag-only co-curing of composite parts, such as composite aerospace parts, and a method of molding and/or co-curing such parts with the thermally expansive tool.

BACKGROUND

Traditionally, the co-curing of composite aerospace components, such as stringers and panels, has been performed in an autoclave arrangement. However, autoclave assemblies are large, expensive to operate, and can be difficult to maintain. Some attempts have been made to develop a vacuum-bag-only curing processes. However, the cure quality of an autoclave assembly has not yet been duplicated in these alternative vacuum-bag-only systems.

Thus, a vacuum-bag-only curing tool and method using the same are required which provide high cure quality and which avoid the complexities and expense of a traditional autoclave arrangement.

BRIEF SUMMARY

A device is provided for selectively applying pressure to a fiber impregnated resin, where the device includes a thermally expansive material having a body which extends in an axial direction from an upper terminal surface to an opposite lower terminal surface, a first retaining member affixed to one of the upper terminal surface and the lower terminal surface, wherein the first retaining member is configured to limit expansion of the thermally expansive material in a direction substantially perpendicular to the axial direction when the thermally expansive material is subjected to an increase in temperature.

The device may further comprise a second retaining member affixed to the other one of the upper terminal surface and the lower terminal surface. The second retaining member may be configured to limit expansion of the thermally expansive material in the direction substantially perpendicular to the axial direction and to direct expansion in the axial direction when the thermally expansive material is subjected to an increase in temperature.

The device may further comprise at least one internal retaining member disposed within the body of the thermally expansive material. The at least one internal retaining member may have a first surface oriented in a direction facing the first retaining member and a second surface oriented in a direction facing away from the first retaining member, wherein the first and second surfaces of the at least one internal retaining member are affixed to the thermally expansive material to limit expansion of the thermally expansive material in the direction substantially perpendicular to the axial direction and to direct expansion in the axial direction when the thermally expansive material is said subjected to an increase in temperature.

The device may further comprise a plurality of internal retaining members disposed within the body of the thermally expansive material. Each of the plurality of internal retaining members may have a first surface oriented in a direction facing the first retaining member and a second surface oriented in a direction facing away from the first retaining member, wherein the first and second surfaces of each of the plurality of the internal retaining members are affixed to the thermally expansive material to limit expansion of the thermally expansive material in the direction substantially perpendicular to the axial direction and to direct expansion in the axial direction when the thermally expansive material is said subjected to an increase in temperature.

The device may further comprise a casing in which the thermally expansive material and the first and second retaining members are disposed. The casing may include an upper portion disposed adjacent to and in contact with the first retaining member and a lower portion disposed adjacent to and in contact with the second retaining member.

In some embodiments, at least one of the upper and lower portions of the casing may include a seat for receiving and restraining the respective first and/or second retaining member in the direction substantially perpendicular to the axial direction.

The casing may further include an axially restraining member which is configured to limit expansion of the thermally expansive material in the axial direction when the thermally expansive material is said subjected to an increase in temperature.

The axially restraining member may comprise a screw assembly which extends from the upper portion of the casing to the lower portion of the casing and is configured to limit movement of the upper portion relative to the lower portion.

The lower portion of the casing may include gaps in which anchors of the screw assembly are disposed. The anchors may be configured to move within the gaps in the axial direction from a lower to an upper extent of the gaps wherein movement of the upper portion of the casing in the axial direction ceases upon contact of the anchor with the upper extent of the gaps.

The first retaining member may be a heating element configured to selectively subject the thermally expansive material to said increase in temperature.

One or more of the first and the internal retaining members may be a heating element configured to selectively subject the thermally expansive material to said increase in temperature.

One or more of the first retaining member and the plurality of internal retaining members may be a heating element configured to selectively subject the thermally expansive material to said increase in temperature.

The device may further comprise one or more internal retaining members disposed within the body of the thermally expansive material. The internal retaining members may each have an upper surface oriented in a direction facing the first retaining member and a lower surface oriented in a direction facing the second retaining member, wherein the upper and lower surfaces of the internal retaining members are affixed to the thermally expansive material such that the internal retaining member are configured to limit expansion of the thermally expansive material in the direction substantially perpendicular to the axial direction when the thermally expansive material is said subjected to an increase in temperature.

The device may further comprise a plurality of internal retaining members disposed within the body of the thermally expansive material. The internal retaining members may each have an upper surface oriented in a direction facing the first retaining member and a lower surface oriented in a direction facing the second retaining member, wherein the upper and lower surfaces of the internal retaining members are affixed to the thermally expansive material such that the internal retaining member are configured to limit expansion of the thermally expansive material in the direction substantially perpendicular to the axial direction and to direct expansion in the axial direction when the thermally expansive material is said subjected to an increase in temperature.

Also provided herein is a vacuum-bag-only mold for forming composite aerospace components, comprising a device as disclosed herein.

Also provided herein is a method for curing a fiber impregnated resin during out-of-autoclave curing, where the method includes providing a thermally expansive material having a body which extends in an axial direction from an upper terminal surface to an opposite lower terminal surface, affixing a first retaining member to the upper terminal surface, affixing a second retaining member to the lower terminal surface, arranging one of the upper and lower retaining members adjacent to the resin to be cured, increasing the temperature of the thermally expansive material to effect expansion thereof, and limiting an expansion of the thermally expansive material in a direction perpendicular to the axial direction and directing the expansion in the axial direction by the affixing of the first and second retaining members.

The method may further comprise affixing an internal retraining member within the body at a position between the upper and lower retaining members for said limiting and said directing of the expansion.

The method may further comprise encasing the thermally expansive material and the first and second retaining members in a casing and arranging an upper portion of casing adjacent to and in contact with the first retaining member and a lower portion disposed adjacent to and in contact with the second retaining member.

The method may further comprise limiting expansion of the thermally expansive material in the axial direction when the thermally expansive material is said subjected to an increase in temperature by applying an axial restraining member to the casing.

Said increasing the temperature of the thermally expansive material may comprise at least one of the first and second retaining members providing heat to the material.

The method may further comprise: providing multiple bodies of the thermally expansive material; affixing a first said retaining member and a second said retaining member to each of the multiple bodies; and arranging the multiple upper or lower retaining members of the multiple bodies adjacent to and across a surface of the resin to be cured.

The method may further comprise configuring the multiple bodies such that said expansion in the axial direction of at least one of the multiple bodies is different from said expansion in the axial direction of at least another of the multiple bodies.

BRIEF DESCRIPTION OF THE DRAWINGS

FIG. 5A-5B are schematic views of thermally expansive body of the tool of FIG. 1;

FIG. 7 is a graph showing strength and displacement of the tool of FIGS. 1-4 when subjected to an increase in temperature;

DETAILED DESCRIPTION

Figure 1:
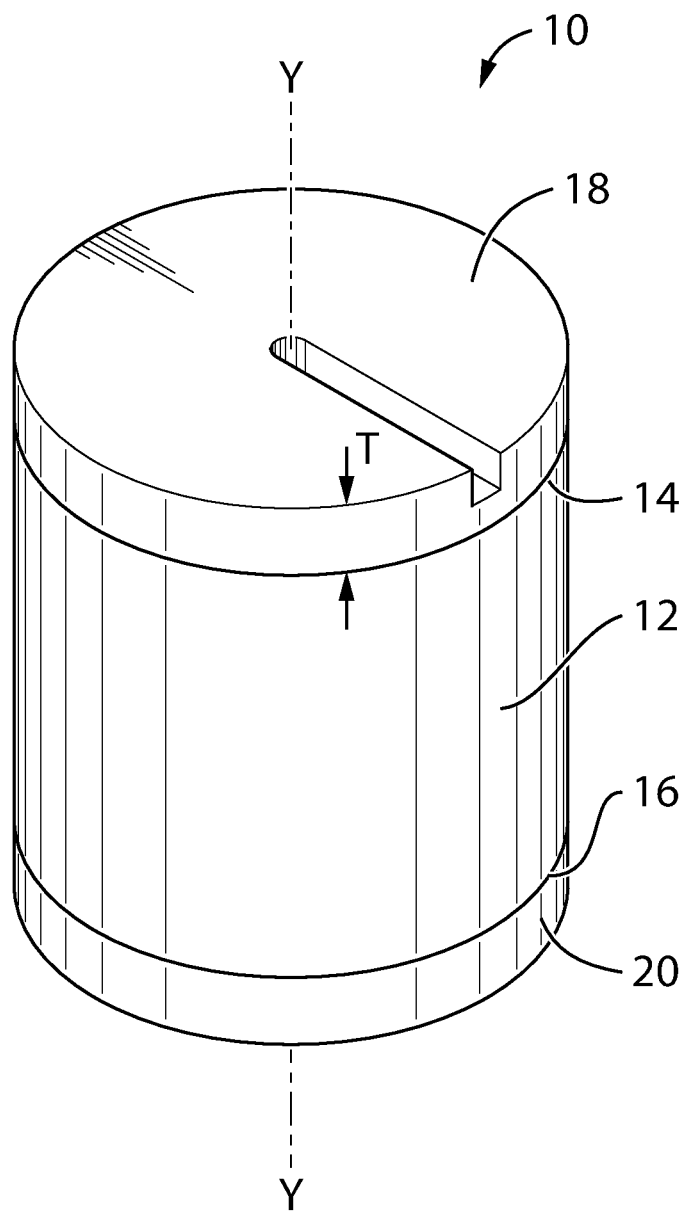
FIG. 1 is a perspective view of a tool for applying pressure during a molding process in one embodiment of the invention.

FIG. 1 shows a molding tool 10 in one exemplary embodiment of the invention. The tool 10 includes a body 12 having an upper surface 14 and an opposite lower surface 16. The body 12 extends in an axial direction Y-Y between the upper and lower surfaces 14 and 16, respectively. The body 12 terminates at an upper extent at the upper surface 14 and at a lower extent at the lower surface 16.

The tool further includes an upper retaining member 18 disposed upon and fixed to the upper surface 14 of the body 12 of the tool 10. Similarly, the tool 10 includes a lower retaining member 20 disposed upon and fixed to the lower surface 16 of the body 12. In the illustrated embodiment, the body 12 of the tool 10 is cylindrically shaped. The retaining members 18 and 20 are correspondingly disc shaped and extend continuously over the entire surface area of the respective upper and lower surfaces 14 and 16 of the body 12.

Figure 2:
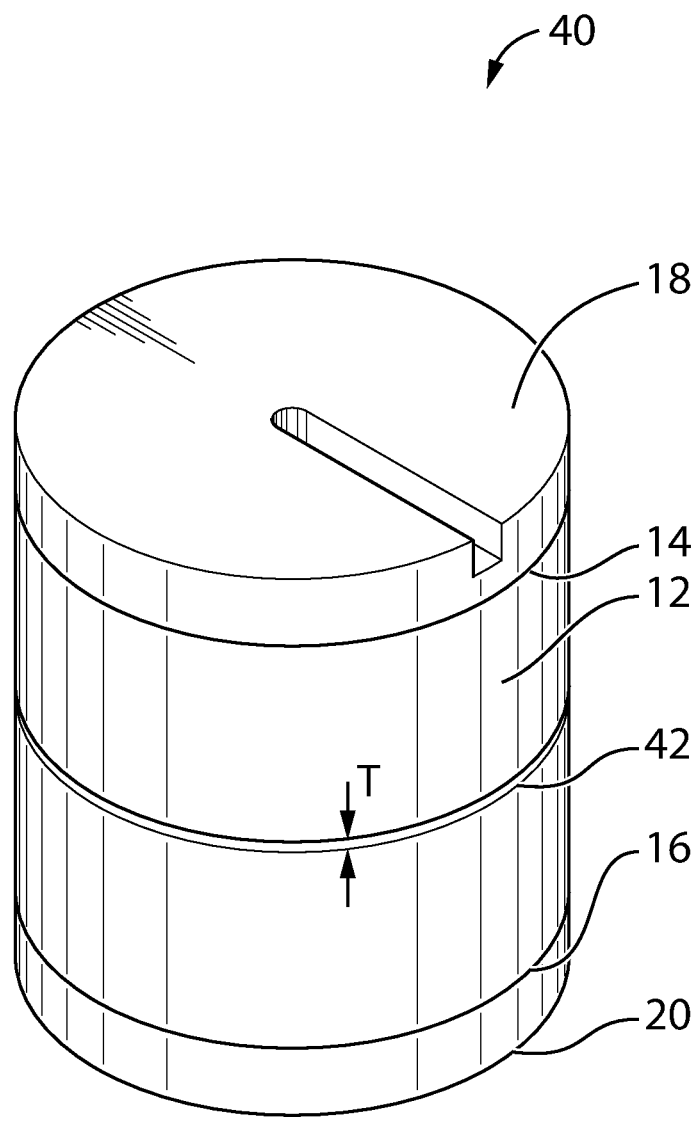
FIG. 2 is a perspective view of another embodiment thereof.
Figure 3:
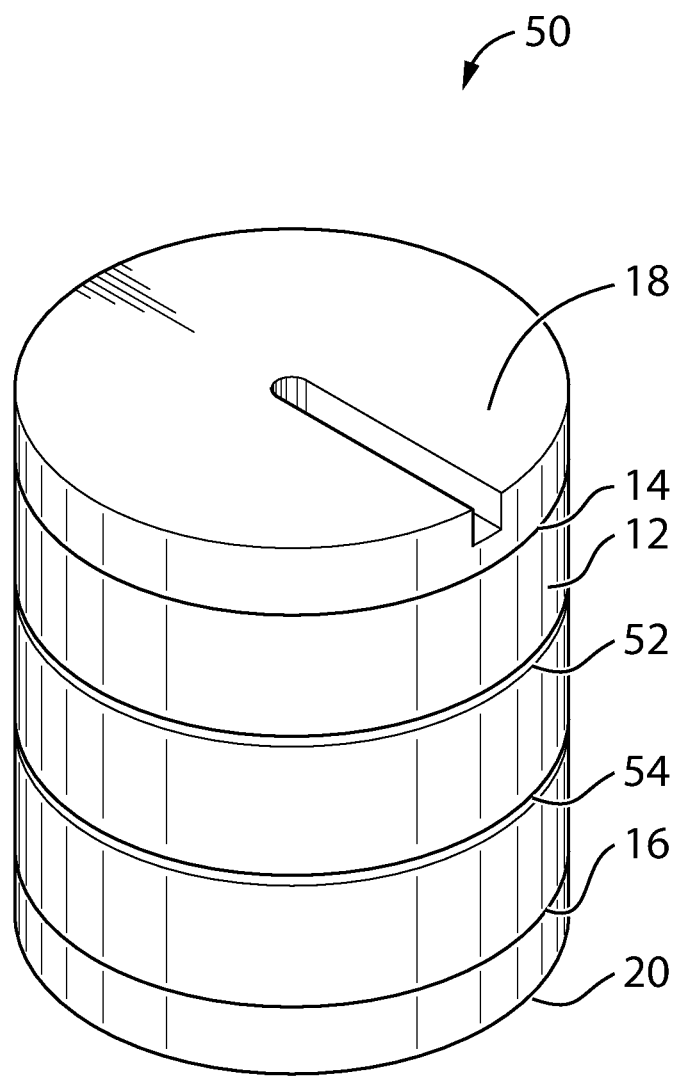
FIG. 3 is a perspective view of another embodiment thereof.
Figure 4:
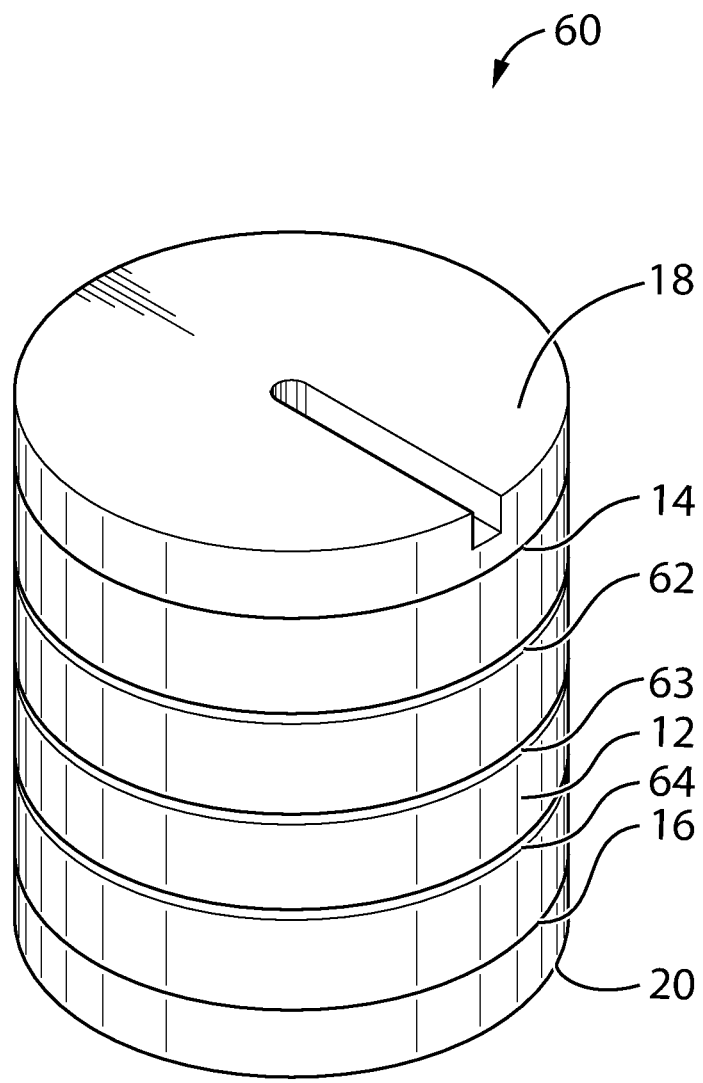
FIG. 4 is a perspective view of another embodiment thereof.

FIGS. 2-4 show alternate embodiments of the tool in accordance with the broad scope of the invention. Herein and throughout, consistent reference numerals are used to represent common elements in the various drawings. In FIG. 2, a tool 40 includes all of the elements of the tool 10 of FIG. 1 but further includes an internal retaining member 42 disposed within the body 12 of the tool 40. The internal retaining member 42 is a disc shaped member disposed centrally within the body 12 in an orientation parallel to the upper and lower retaining members 18 and 20. The internal retaining member 42 can be disposed generally perpendicular to the axis Y-Y at a mid-point of the vertical extent of the body 12. Alternatively, the member 42 can be disposed elsewhere within the body and may be disposed at an angle with respect to the axis Y-Y of greater than or less than 90 degrees.

FIGS. 3 and 4 illustrate additional embodiments of the tool in which multiple internal retaining members are utilized. FIG. 3 shows a tool 50 having internal retaining members 52 and 54 disposed within the body 12 in an orientation parallel to the upper and lower retaining members 18 and 20. Here, the internal retaining members 52 and 54 are disposed equidistant from one another and from the respective upper and lower retaining members 18 and 20 such that the body 12 of the tool 10 is divided into three substantially similarly sized portions. FIG. 4 illustrates a tool 60 having three internal retaining members 62, 63, and 64 disposed parallel to the upper and lower retaining members 18 and 20, and disposed equidistant from one another and from the respective upper and lower members 18 and 16 such that the body 12 of the tool 10 is divided into four substantially similarly sized portions. Similar to the retaining member 42, the members 42, 52, 62, 63, 64 are arranged parallel to the upper and lower retaining members 18 and 20 and generally perpendicular to the axis Y-Y. However, the members 42, 52, 62, 63, 64 can alternatively be located at any desired location within the body 12 of the tool 10 and may be arranged at an angle with respect to the axis Y-Y and can be parallel or non-parallel with respect to one another.

The internal retaining members of the tools 40, 50, and 60 have a thickness t which is less than a thickness T of the upper and lower retaining members 18 and 20. Like the upper and lower retaining members 18 and 20, the internal retaining members 42, 52, 62, 63, 64 extend continuously across the entire width of the body 12. In accordance with some non-limiting embodiments, the thickness t of the internal retaining members 42, 52, 62, etc., may be, for example, about 0.050 inch to 0.080 inch and, in one particular embodiment, about 0.064 inch. The thickness T of the upper and lower retaining members 18 and 20 may be, for example, about 0.100 inch to 0.400 inch and, in one particular embodiment, about 0.250 inch.

The body 12 of the tools 10, 40, 50, and 60 is formed of a thermally expansive material. Any desired thermally expansive material may be used such as, for example, a thermally expansive elastomer or a combination of elastomers. For example, the body 12 may be formed of a silicone elastomer. The various retaining members discussed herein are formed of any material suitable for being affixed to the body 12 and, as discussed herein below, for limiting the lateral expansion of the body 12 when subjected to an increase in temperature. The retaining members, for example, may be formed of a metallic material such as aluminum, steel, copper, nickel, or any other material, metallic or non-metallic, having a low coefficient of thermal expansion. The body 12 of the various tools disclosed herein is affixed to the retaining members by any suitable method for providing a secure attachment of the body to the retaining members. For example, the body may be bonded to the retaining members with an adhesive or it may be integrally bonded thereto during the formation of the thermally expansive body. Regardless of the technique used to affix the body and the various retaining members, the resulting connection should be sufficiently strong because the integrity of the connection effects is important for the performance of the tool.

In the embodiments discussed above, the upper and lower retaining members 18 and 20 share a common thickness T and the internal members 42, 52, 54, 62, 63, and 64 share a common thickness t where T>t. However, in other embodiments, T may be less than t or equal to t or all thicknesses may vary from one another. Furthermore, the thickness of a particular retaining member may be consistent across the entire member or it may vary.

FIGS. 5A and 5B illustrate a schematic of the body 12 of the tool 10 having no retaining members affixed thereto. When the temperature of the thermally expansive body 12 is increased an amount Δt, the body expands along the axis Y-Y a distance A. Here, the lower surface 16 of the body 12 is stationary such that the expansion is seen at the upper surface 14.

Figures 6A, 6B:
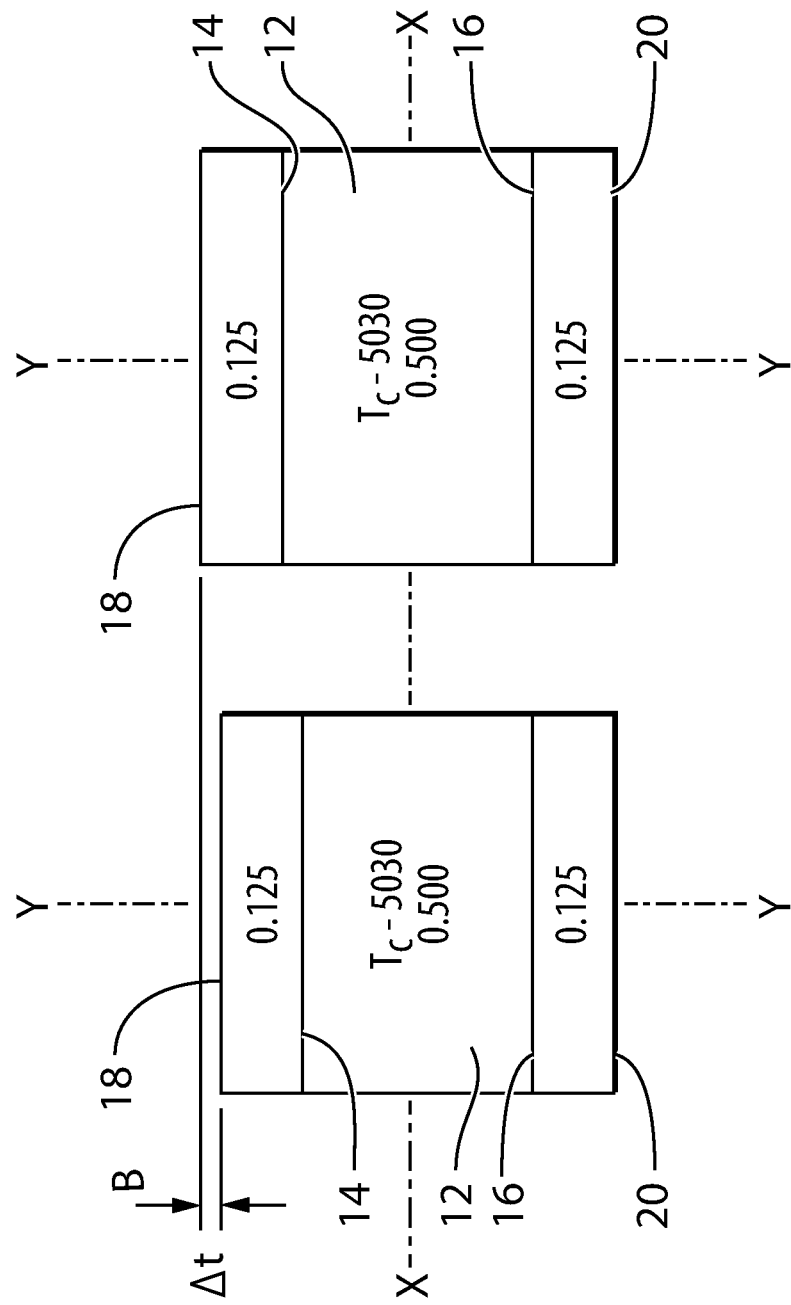
FIGS. 6A-6B are schematic views of the tool of FIG. 1.

FIGS. 6A and 6B illustrate a schematic of the tool 10 having the body 12 affixed to the upper and lower retaining members 18 and 20. Here, when the tool is subjected to the temperature increase Δt, the body 12 expands a distance B in the direction of the axis Y-Y. As illustrated in the schematics of FIGS. 5-6, the distance of expansion B is significantly larger than the expansion distance A. This is because, in the configuration of FIGS. 6A-6B, the upper and lower retaining members 18 and 20 are affixed to the upper and lower surfaces 14 and 16, respectively, of the body 12 and, as such, limit the expansion of the body 12 in a lateral direction X-X. That is, without the retaining members 18 and 20, the body 12 is free to thermally expand in all directions, as shown in FIGS. 5A-5B, including both the Y-Y and X-X directions. However, in FIGS. 6A-6B, the retaining members 18 and 20 restrict movement of the thermally expansive body in the X-X direction and thus the expansion thereof is directed in the Y-Y direction. That is, the retaining members 18 and 20 are not thermally expansive or have a coefficient of thermal expansion which is greater than that of the body 12 such that the members 18 and 20 are not significantly expanded by the increased temperature Δt. Therefore, the dimensions of the retaining members 18 and 20 remain more or less constant when subjected to Δt. Because the thermally expanding body 12 is affixed to the non-expansive retaining members 18 and 20, expansion of the body 12 is limited in a direction of such affixment, that is, in the direction X-X. The body 12 is thus forced to expand in the contrary direction Y-Y thus resulting in the increased expansion distance B.

The addition of the internal retaining members to the tool, as discussed with reference to FIGS. 2-4, further limits the lateral expansion of the body 12 in the direction X-X thus further increasing the amount of expansion in the Y-Y direction. This is because additional surface area of the body 12 is exposed to the non-expanding retaining members. These internal retaining members further brace the body 12 against expansion in the X-X direction, thus the material of the body 12 reacts by increasing expansion in the Y-Y direction. This is illustrated in the graph at FIG. 7 which shows that increased pressure developed by the body and the increased displacement of the body when subjected to Δt are directly related to the number of retaining members employed in the tool. It should be appreciated that there are a number of factors that could impact the lateral expansion of the body of the tool 12 such as the number of retaining members, the tensile strength of the retaining members and the coefficient of thermal expansion of the retaining members.

Figure 8:
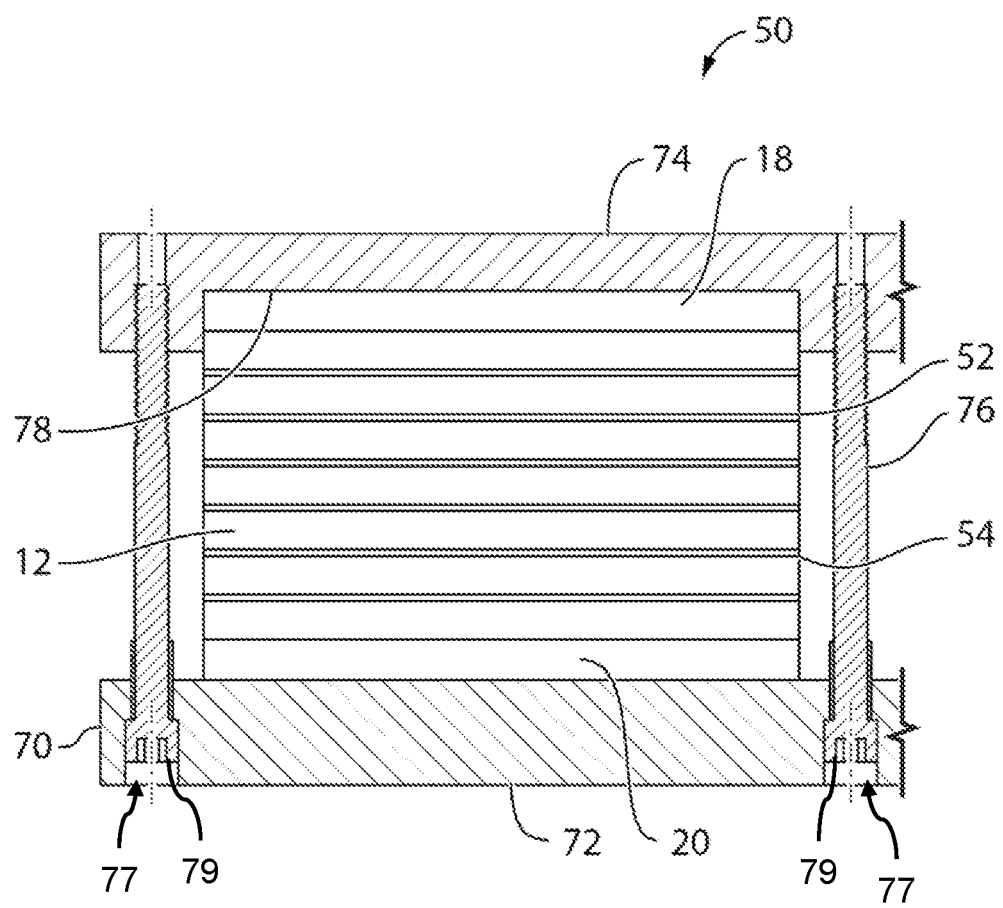
FIG. 8 is a schematic representation of a tool in accordance with the invention disposed within a casing.

FIG. 8 illustrates a further embodiment of the tool 50 in which the body 12 is disposed within a casing 70 including a lower portion 72, an upper portion 74, and an axial restraining member 76 connecting the lower and upper portions 72, 74. In the illustrated example, the upper portion 74 includes a seat 78 in which the upper retaining member 18 is received. This seat 78 further braces the body 12 against thermal expansion in the lateral X-X direction. The lower portion 72 of the casing 70 may additionally and/or alternatively include a similar seat. In this exemplary embodiment, the axial restraining member 76 is a screw controller which is used for limiting vertical expansion of the body 12 in the Y-Y direction. However, the restraining member 76 can be any mechanical device sufficient for controlling, regulating, and/or limiting the vertical expansion of the body 12 in the Y-Y direction. In the illustrated example, the screw controller restraining member 76 regulates the relative position of the opposed lower and upper portions 72, 74 of the casing 70, thus determining the expansion space available for the body 12. By limiting the expansion displacement of the body 12 in this manner, the resulting pressure applied to a part during curing can be controlled. Further, the casing 70 stabilizes the body 12 and allows for the body 12 to have an increased thickness.

Figure 9:
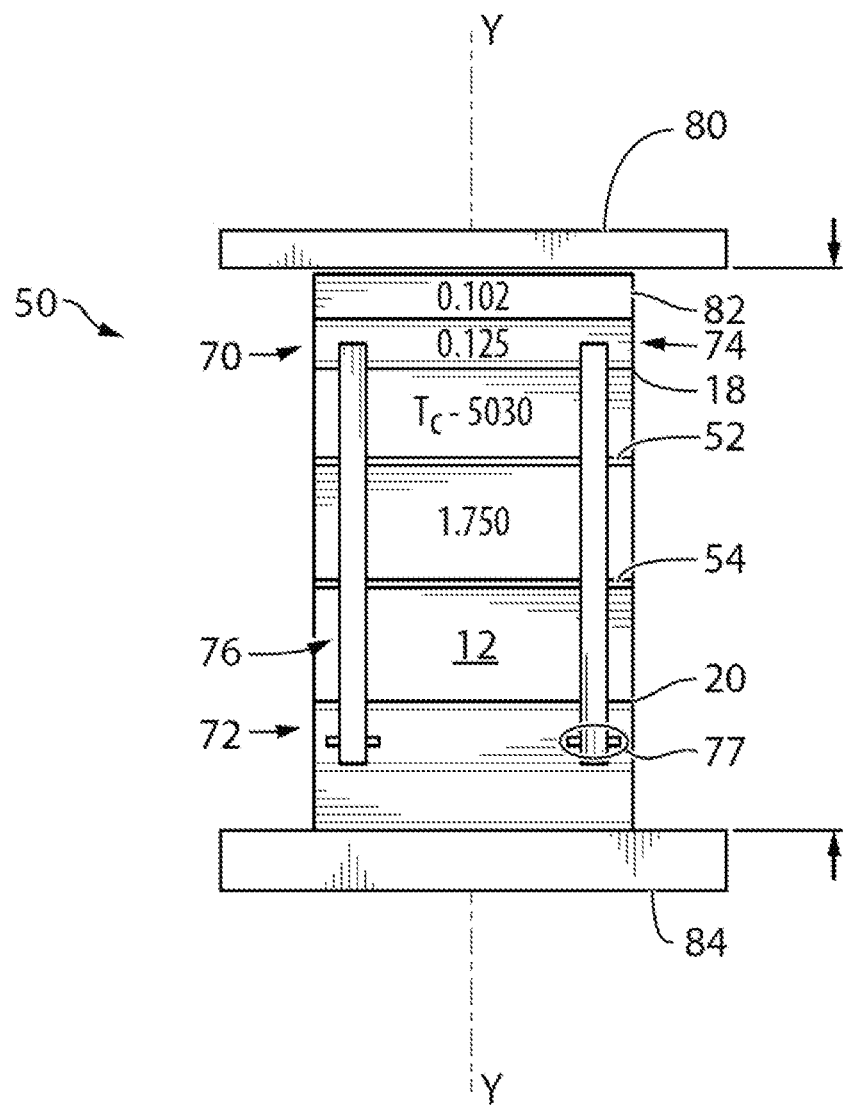
FIG. 9 is another schematic view thereof.

FIG. 9 is a schematic representation of the configuration of FIG. 8. Here, the tool 50 is shown as being disposed against a fiber impregnated resin, prepreg 80, in a curing arrangement. Schim tape 82 is disposed between the upper portion 74 of the casing 70 and the prepreg 80. The lower portion 72 of the casing 70 is disposed upon a base 84. The screw controllers (see axial restraining member 76) include displacement gaps 77 at the lower portion 72 of the casing 70 in which a limited movement of the screw controllers is permitted such that the thermal expansion of the body 12 in the Y-Y direction is correspondingly limited. That is, the screw controllers are fixed at the upper portion 74 of the casing 70 and include anchors 79 (see FIG. 8) which are moveably disposed within the gaps 77 at the lower portion 72. As such, during application of heat to the tool 10, the body 12 thermally expands in the Y-Y direction due to the restraining members 52, 54, as discussed previously. The upper portion 74 of the casing, and the screw controller which is affixed thereto, both move in the Y-Y direction along with the expanding body 12. Correspondingly, the anchors 79 move within the gaps 77 in the Y-Y direction until the anchors 79 contact an upper extent of the gaps 77 which suspends movement of the anchors 79 and which likewise ceases the movement in Y-Y direction of the screw controllers, the upper portion 74 of the casing 70, and, resultantly, of the body 12. As such, the casing 70 can be specifically configured to allow for precise control of the expanding body 12. That is, the size of the gaps 77 can be increased or decreased as desired to allow for greater or lesser expansion of the body, thus allowing for customization of the molding tool.

The tool described herein is used to apply pressure to a part during a molding operation, particularly, to a vacuum-bag-only molding of a fiber reinforced composite aerospace component and, more particularly, to a vacuum-bag-only co-curing of aerospace components such as stringers and panels. Generally, one or more of the tools 10, 40, 50, 60, described herein, are disposed against a prepreg and subjected to an increase in temperature. The thermally expansive body 12 of the tools expands in the Y-Y direction and bears against the prepreg thus applying a pressure thereto. As alluded to above, this pressure can be precisely controlled by configuring one or more of a number of factors which affect the expansion of the tool and the pressure generated thereby. These factors include: the number of tools utilized and the placement thereof relative to the prepreg; the temperature applied to the tool; the coefficient of thermal expansion of the body; the number of retraining members affixed to the body; the shape and size of the body; the overall surface area of the body applied to the prepreg; and, if a casing is employed, its limitation on the expansion of the body.

Figure 10:
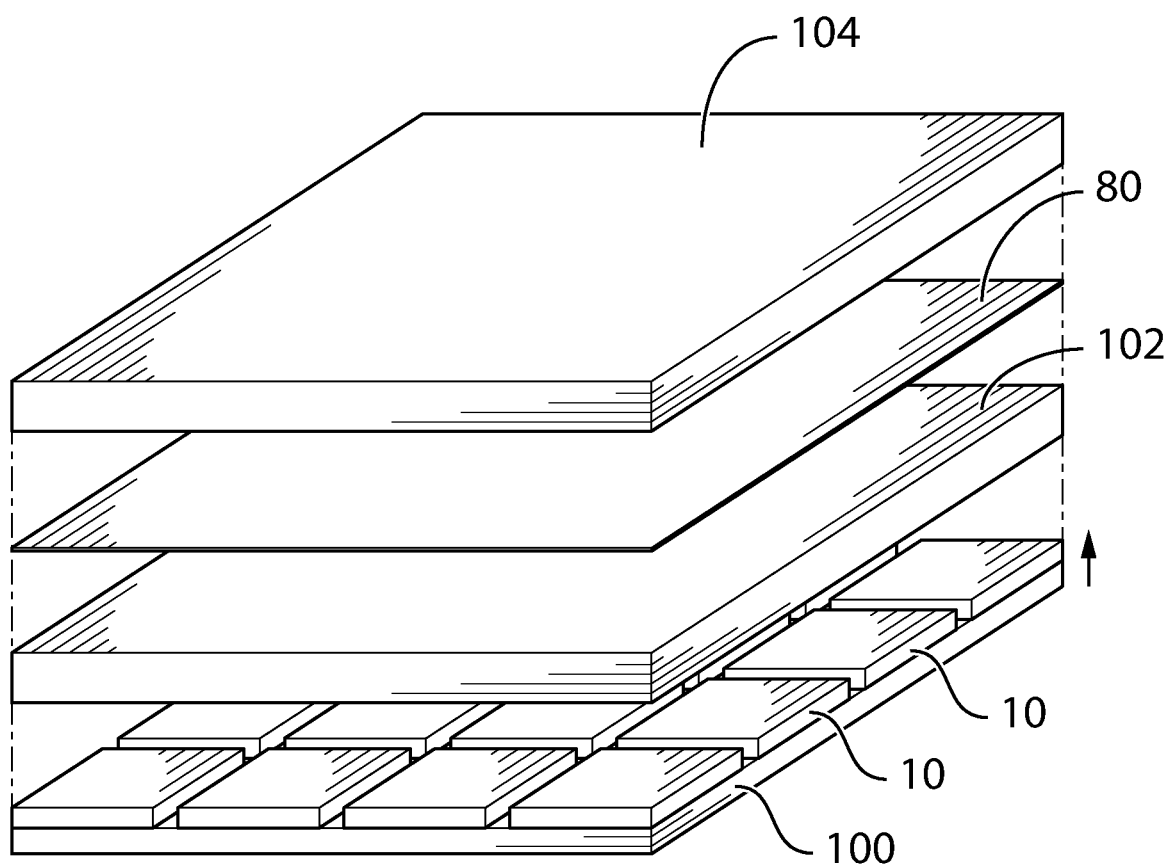
FIG. 10 is molding arrangement including a plurality of the tools of FIG. 1.

FIG. 10 illustrates a molding arrangement including a plurality of tools 10 affixed to a caul plate 100 where the tools bear against an aerospace stringer and frame 102 disposed above the tools 10. The tools 10 may be used with and/or without the casing 70 described hereinabove. Where a casing 70 is utilized, the casing 70 may include one or more tool bodies 12. A prepreg 80 is placed above the stringer and frame 102 and sandwiched there against by an IML tool 104. When subjected to increased temperature, the tools expand in a direction toward the stringer and frame 102 and, as discussed herein, result in the application of pressure upon the prepreg 80.

An arrangement such as that shown in FIG. 10 may be used to provide differential pressure to a part during the molding process. That is, in one arrangement utilizing a plurality of the tools 10, the tools 10 can be identically configured to expand similarly and to apply pressure similarly such that the overall pressure applied during molding is consistent across the arrangement. However, in another arrangement, the extent of expansion and the pressure applied during molding can be varied in the plurality of tools 10 such that a variable pressure is achieved across the arrangement. This is accomplished by adjusting the various factors mentioned above which—affect the pressure applied by the tools, e.g., the coefficient of thermal expansion of the body 12, the number of retraining members utilized, etc. Additionally, a plurality of the tools 10 may be used to apply multi-directional pressure to a part during manufacture. For example, a part in a three-dimensional coordinate space having orthogonal x, y, and z axes, may be acted upon by tools 10 in the (+) and/or (−) x, y, z directions, or in other directions which extend between these coordinate axes. Such multi-directional pressure may be equivalent pressure exerted by the tools 10 or may be differential pressure, as discussed above. Furthermore, the plurality of tools 10, whether applying multi-directional or uni-directional pressure, may do so simultaneously or non-simultaneously.

In a further embodiment of the invention, one or more of the retraining members 18, 20, 42, 52, 54, etc., may comprise a heating element. That is, the upper, lower, and/or internal retraining members may be configured to radiate heat and thus can be used to subject the thermally expansive body 12 to an increase in temperature. The heat radiated by the upper, lower, and/or internal retaining members further allows heat to transfer through the body 12 in a more uniform fashion, which may improve the control over the displacement of the body 12. Similarly, the casing 70 or a portion thereof may comprise one or more heating elements and can be used in combination with heating element retraining members, or individually by itself, in order to apply a temperature increase to the body. For example, one or more of the upper portion 74, the lower portion 72, and the axial restraining member 76 can be configured to selectively radiate heat to the body 12.

The tool described herein is particularly advantageous in the co-curing of aircraft stringers. For example, T-stringers, J-stringers and bulb stringers with UD filler and/or with bonded graphite tube inserts, may be co-cured with aircraft panels by using the tool in the manner discussed above. These and other composite parts can be efficiently co-cured without the need for an autoclave, thus resulting in a less expensive and a more simple manufacturing method that provides high quality curing and molding.

Herein, the molding tool is described as including upper and lower retaining members and one, a plurality, or no internal retaining members disposed in the body. The specific number and arrangement of the respective retaining members is purely exemplary. Other embodiments may include any desired number and arrangement of the retaining members in order to limit lateral expansion of the thermal expansive body in the X-X direction. That is, the tool may include upper and lower retaining members and a single, centrally disposed, internal retaining member. Alternatively, such tool may include four internal retaining members or five, or six, etc. Similarly, the tool may not include one or both of the upper and lower retaining members. For example, the tool may include the upper retaining member, but may omit the lower retaining member.

As described herein, the body of the tool is described as having a cylindrical shape and the upper, lower, and any retaining members are described as having a disc shape where the retaining members extend continuously across the upper surface, the lower surface, and/or the internal surfaces of the body in contact with the retaining members. This is merely exemplary. The body of the tool may assume any desired cross-sectional shape, e.g., circular, oval, oblong, curvilinear, square, rectangle, octagonal, hexagonal, triangular, star-shaped, rectilinear, etc. Moreover, the cross-sectional shape of the body of the tool may be consistent along the vertical axis Y-Y or it may vary.

The retaining members may be shaped similar to the cross-sectional shape of the body of the tool. For example, as described above, the body of the tool may be cylindrical having a circular cross-section and the retaining members may correspondingly be disc shaped. As such, the shape of the retaining member may correspond to that of the body. Alternatively, the retaining member may have a shape distinct from the cross-sectional shape of the body. Each retaining member employed within the tool may be identically shaped or may vary, as desired. The retaining members have been described herein as extending continuously across the contacted surface of the body of the tool. Alternatively, one or more retaining members may extend partially across the contacted surface of the body of the tool. For example, in the case of the cylindrically shaped tool 40, the retaining member 42 may be shaped wholly or partially as a disc, a ring, a star, a square, triangle etc., and may be solid or include apertures therethrough.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed:

1. A device for selectively applying pressure to a fiber impregnated resin, the device comprising:
    a thermally expansive material having a body which extends in an axial direction from an upper terminal surface to an opposite lower terminal surface;
    a first retaining member affixed to at least one of the upper terminal surface and the lower terminal surface; and
    at least one disc-shaped internal retaining member disposed within the body of the thermally expansive material, the at least one internal retaining member having a first surface oriented in a direction facing the first retaining member and a second surface oriented in a direction facing away from the first retaining member,
    wherein the first retaining member is configured to limit expansion of the thermally expansive material in a direction substantially perpendicular to the axial direction and to direct expansion in the axial direction when the thermally expansive material is subjected to an increase in temperature and wherein the first and second surfaces of the at least one internal retaining member are affixed to the thermally expansive material to limit expansion of the thermally expansive material in the direction substantially perpendicular to the axial direction and to direct expansion in the axial direction when the thermally expansive material is subjected to the increase in temperature.

2. The device of claim 1, wherein the first retaining member is a heating element configured to selectively subject the thermally expansive material to said increase in temperature.

3. The device of claim 1, wherein one or more of the first and the internal retaining members is a heating element configured to selectively subject the thermally expansive material to said increase in temperature.

4. The device of claim 1, comprising a plurality of the disc-shaped internal retaining members disposed within the body of the thermally expansive material.

5. The device of claim 4, wherein one or more of the first retaining member and the plurality of internal retaining members is a heating element configured to selectively subject the thermally expansive material to said increase in temperature.

6. The device of claim 1, further comprising a second retaining member affixed to the other one of the upper terminal surface and the lower terminal surface, the second retaining member being configured to limit expansion of the thermally expansive material in the direction substantially perpendicular to the axial direction and to direct expansion in the axial direction when the thermally expansive material is subjected to the increase in temperature.

7. The device of claim 6, comprising a plurality of the disc-shaped internal retaining members disposed within the body of the thermally expansive material, the internal retaining members each having the second surface oriented in a direction facing the second retaining member.

8. The device of claim 6, further comprising a casing in which the thermally expansive material and the first and second retaining members are disposed, the casing including an upper portion disposed adjacent to and in contact with the first retaining member and a lower portion disposed adjacent to and in contact with the second retaining member contact with the second retaining member.

9. The device of claim 8, wherein at least one of the upper and lower portions of the casing include a seat for receiving and restraining the respective first and/or second retaining member in the direction substantially perpendicular to the axial direction.

10. The device of claim 8, wherein the second surface is oriented in a direction facing the second retaining member.

11. The device of claim 8, wherein the casing further includes an axially restraining member which is configured to limit expansion of the thermally expansive material in the axial direction when the thermally expansive material is said subjected to an increase in temperature.

12. The device of claim 11, wherein the axially restraining member comprises a screw assembly which extends from the upper portion of the casing to the lower portion of the casing and is configured to limit movement of the upper portion relative to the lower portion.

13. The device of claim 12, wherein the lower portion of the casing includes gaps in which anchors of the screw assembly are disposed, the anchors being configured to move within the gaps in the axial direction from a lower to an upper extent of the gaps wherein movement of the upper portion of the casing in the axial direction ceases upon contact of the anchor with the upper extent of the gaps.

* * * * *